United States Patent [19]
Schreiber

[11] Patent Number: 4,503,615
[45] Date of Patent: Mar. 12, 1985

[54] GUIDE STRUCTURE

[76] Inventor: Jerry B. Schreiber, 9905 SW. 97 Pl., Miami, Fla. 33176

[21] Appl. No.: 467,315

[22] Filed: Feb. 17, 1983

[51] Int. Cl.³ .............................................. G01B 5/03
[52] U.S. Cl. .................................... 33/1 M; 33/1 C; 33/430; 33/464; 33/189; 400/705.5
[58] Field of Search ................ 33/1 M, 1 B, 1 C, 430, 33/431, 464, 15 D, 470, 427, 443, 189; 400/706, 705.5, 522; 282/29 C, 29 R

[56] References Cited

U.S. PATENT DOCUMENTS

| 1,039,057 | 9/1912 | Hill | 33/464 X |
| 1,539,704 | 5/1925 | Texoon | 33/184.5 |
| 1,630,414 | 5/1927 | Baier | 33/464 |
| 1,849,493 | 3/1932 | Larkin | 33/437 |
| 2,561,469 | 7/1951 | Guinez | 33/437 |
| 2,821,027 | 1/1958 | Billhimer | 33/189 |

Primary Examiner—William D. Martin, Jr.
Attorney, Agent, or Firm—John Cyril Malloy

[57] ABSTRACT

A guide structure designed to locate blank spaces on a displayed form of a word processor through the utilization of a line scale and a character scale movably attached to and selectively positionable over the face of a conventional paper or like material form wherein indicia formed on each of the scales serves to establish coordinates of any blank space on a material form regardless of its location. The coordinates are then related to the operator of the word processor along with informational instructions for filling the blank space.

7 Claims, 4 Drawing Figures

GUIDE STRUCTURE

BACKGROUND OF THE INVENTION

1. Field of the Invention

This invention relates to a guide structure including at least two relatively movable line and character scales selectively positionable over the face of a standard or conventional form wherein any given blank space on the form may be located and/or identified.

2. Description of the Prior Art

In the use of modern day word processors it is common practice to "store" in the memory thereof the content of various forms. When a particular form is required, it is retrieved by the operator of the word processor from the processor's memory. Information supplied to the operator allows the operator to fill in the blank spaces with information particular to a given application or situation. Much time is of course saved in that the operator does not have to type the entire form from beginning to end each time such a frequently used form is utilized.

However, when forms encompassing a great number of blank spaced are repeatedly used, confusion of the operator of such a word processor frequently occurs when a particular blank space to be filled in not properly or adequately identified by one providing the informational instructions. Commonly, the one providing the instructions refers to a conventional material form and instructs the operator of a word processor by either direct or mechanical dictation as to what information is to be utilized to fill each of the specific blanks contained in the standard form. However, unless there is a systematic approach to identifying each of the blanks to be filled, the above set forth confusion can easily occur.

Accordingly, there is a need for a guide structure or like device applicable for use with conventional paper material form and which is structured specifically for the purpose of locating and identifying each of any number of blank spaces on a given form.

Such a guide structure should be capable of efficient operative use and should incorporate means to identify a given space which is relatively fool-proof, thereby preventing the wrong information from being placed in the wrong blank space. Such means to identify a given space or location on a material form should be interchangeable with the scale means utilized to identify locations or blank spaces of a form shown on the display screen of the aforementioned type of word processor.

Numerous types of apparatus and structures designed for standardizing forms and/or rendering the use of such forms more convenient are well known in the prior art. Reference is hereby made to the U.S. patents to Dalboe, U.S. Pat. No. 2,878,917; and Larrabee, U.S. Pat. No. 4,159,130. Both of these patents disclose structure used in combination with standardized form-like material wherein the normal utilization of the intended document is made more efficient. However, neither of these references disclose the concept of locating a specific blank space or surface area portion on a conventional standardized form wherein such identified location can be readily transferred, through the operator of a word processor, for the purpose of locating the same space on a display screen of the same word processor whether or not the standardized form is "stored" in word processor memory and able to be displayed on the display screen.

SUMMARY OF THE INVENTION

The present invention is directed towards a guide structured for removable attachment to a standardized paper or like material form and including at least two scales selectively positionable over the face of the form for locating any blank space thereon.

More specifically, the guide structure of the present invention includes a line scale and a character scale. Each of these scales has a substantially elongated configuration. The line scale is disposed to extend along the length of the form, wherein the length is defined as the distance between the top and bottom edges thereof. Similarly, the character scale is disposed to extend along the width of the form, wherein the width is defined by the dimension between the two lateral or side edges of the form. Accordingly, the line scale and character scale are disposed in perpendicular relation to one another. Each of the scales includes opposite ends, at least one of which my be slidably secured along the edge of one of the ends or alternately along the edge of one of the sides respectively. Therefore, the line scale is removably attachable to the form so as to move in a direction transverse to its own longitudinal axis and across the width of the form. The character scale in turn is structured to slidably move in a direction transverse to its own longitudinal axis or along the length of the form.

Each of the line scale and character scale includes an elongated slot integrally formed therein and disposed and configured to extend substantially along the entire length thereof. An attachment means in the form of a pin means extends through both of the slots at their point of intersection. Since this pin means is not fixedly attached to either of the line scale or character scale but conversely is movably secured to both, each of the scales may move relative to the other scale while at the same time moving relative to the surface of the standardized form.

Indicia is formed on the exposed surface of each of the line scale and character scale. The indicia formed on the respective scale corresponds to the line scale and character scale indicia on a display screen of a modern day word processor. Therefore, selective positioning of the respective scales relative to a blank space, when the scales are movably affixed on the conventional form, serves to identify and/or locate the blank space by coordinant readings of the indicia on the respective scales. This information is then transferred to the operator of the word processor along with informational instructions on what information is to be filled in the indentified and located blank space.

For example, the name of a client is intended to be inserted on a first or any given space on a conventional form. The instructor selectively moves both the line scale and character scale such that the indicia on each establishes a coordinant of the first character of the referred to first or pre-selected space. Such a referred to space may for instance be located at line 7, character 23. The instructor merely identifies to the operator the coordinants of the location of the space referred to along with the client's name. Confusion is thereby eliminated since the same indicia readings are present on the display screen of a given word processor. This in turn allows the operator of the word processor to precisely locate the referred to space to be filled with the client's name.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the nature of the subject invention, reference should be had to the following detailed description taken in connection with the accompanying drawings, in which.

Similar reference characters refer to similar parts throughout the several views of the drawings.

DETAILED DESCRIPTION OF THE PREFERRED EMBODIMENT

Figure 1:
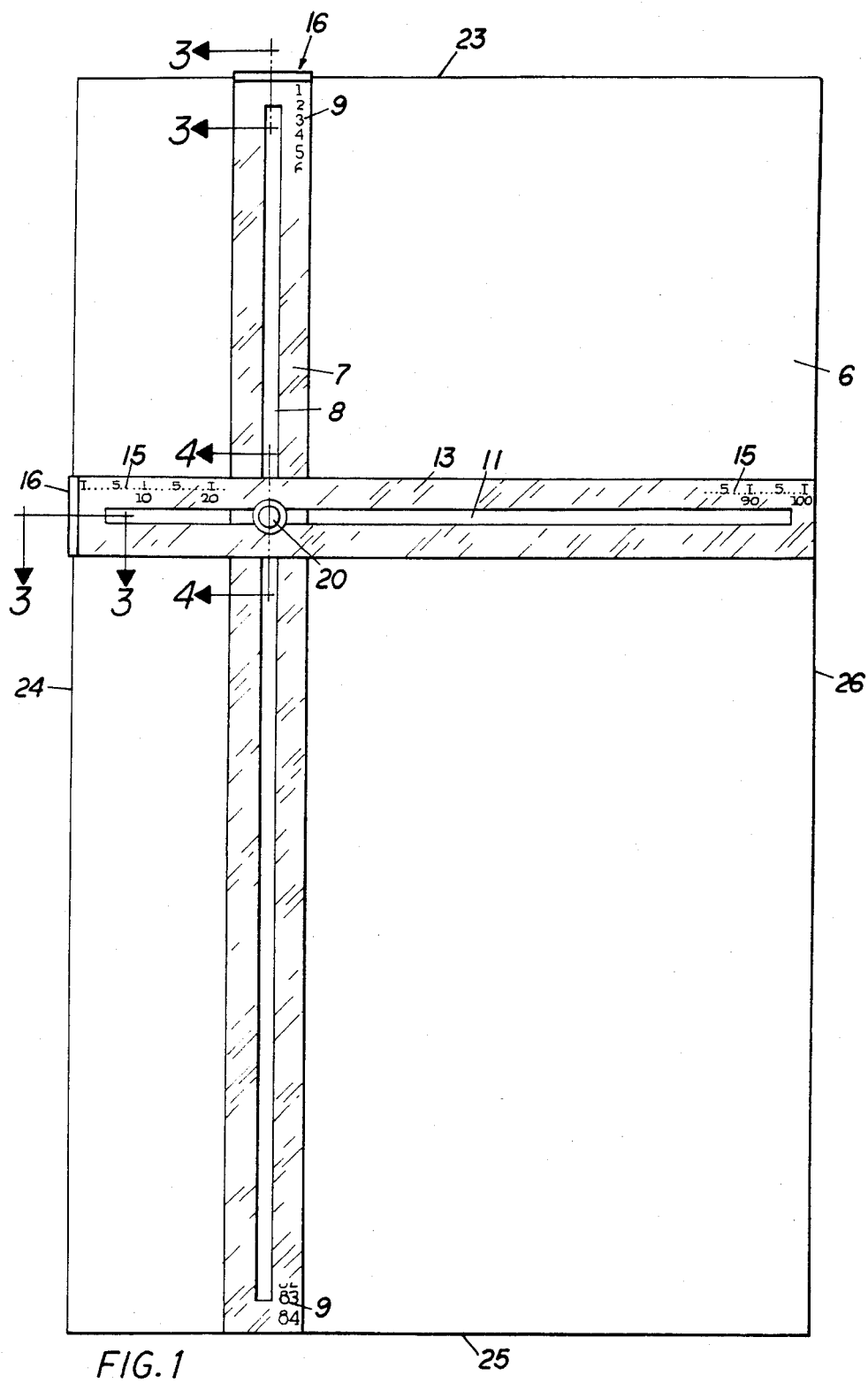
FIG. 1 is a front elevational view of the guide structure of the present invention movably mounted on a paper material or like form.
Figure 2:
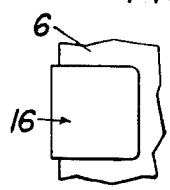
FIG. 2 is a rear elevational view of the embodiment of FIG. 1.

As shown in FIG. 1, the guide structure of the present invention is shown mounted on a paper or like material standardized form 6. More specifically, the guide structure includes a line scale 7 having a substantially elongated configuration and including an elongated slot 8 integrally formed therein and extending substantially along the length thereof. Indicia 9 representing line position is formed on an exposed surface of the line scale 7 and also extends along the length thereof for the purpose of locating and/or identifying line spaces along the entire length of the standardized form.

Similarly, the guide structure includes a character scale 13 also having an elongated configuration and attached to the line scale 7 in transverse relation thereto. The character scale 13 also has an elongated slot 11 integrally formed therein and extending substantially along the length thereof. Indicia 15 representing the character spaces or location is formed along the length of the character scale and is representative to identify the particular character spaces involved.

Figure 3:
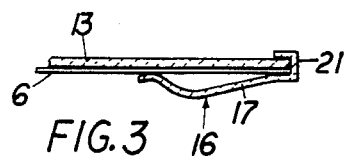
FIG. 3 is a sectional view taken along line 3—3 of FIG. 1.
Figure 4:
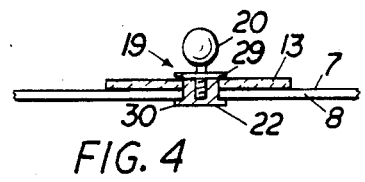
FIG. 4 is a sectional view in partial cutaway taken along line 4—4 of FIG. 1.

It should be noted that the indicia 9 on line scale 7 and the indicia 15 on character scale 13 are both duplicate to the coordinate line and character scales or indicia found on the display screen of a word processor. Therefore, any given coordinate location on the standard form 6 representing a line space and a character space can be identified by the coordinants of the respective indicia on the respective line scale and character scale. Once this information has been determined, transposition to the display screen and any duplicate form displayed thereon can serve to readily identify any given space or surface area location on the displayed form. Each of the line scale and character scale includes a connecting means generally indicated as 16. Each of the connecting means includes a clip-like structure 17 having an inherent spring bias which serves to slidably engage the undersurface of the form 6 as best shown in FIG. 3. A U-shaped flange 21 serves to at least partially embrace or surround a given edge 23, 24, 25, or 26 depending upon the location of the clip member 17. Therefore, at least one end of each of the line scale 7 and the character scale 13 slidingly embrace or engage a correspondingly positioned edge 23 and 24 of the form 6. It will be noted of course that the line scale 7 is always located substantially parallel to the longitudinal axis of the form 6 and is affixed thereto so as to move in a direction substantially perpendicular to its own longitudinal axis and colinear to the longitudinal axis of the character scale 13. Similarly, the character scale 13 moves "up and down" the form in a direction transverse to its own longitudinal axis and colinear to the longitudinal axis of the line scale 7. Therefore, at least one end of each of the scales must embrace a correspondingly positioned edge 23 and 24.

Further structural features of the present invention include an attachment means serving to movably interconnect the scales to one another. The attachment means includes a knob or handle 20 secured to a body portion 22 of a pin means generally indicated as 19. The body or intermediate portion of the base 22 of the pin means 19 is narrowed and serves to extend through both slots 8 and 11 formed respectively in the line scale and character scale. Further, the base of the pin means 19 engages the respective slots at the junction or point of intersection between the two scales. Outwardly extending flanges 29 and 30 of the base of the pin means overlap the slots thereby preventing the inadvertent removal of the pin means from movable engagement with either the scale 7 or 13. It that the pin means 19 is freely movable relative to each of the scales 7 and 13, the scales may be moved relative to one another and both positioned relative to a given blank space or surface area portion of the form 6. Any given blank space or surface location may therefore be identified by line and character coordinates. This information is then transferred to the appropriate space on the displayed form on the display screen of a word processor by establishing the same coordinants.

The above therefore will eliminate confusion in locating and therefore filling out the blank spaces in a displayed form on a subject word processor.

What is claimed is:

1. A guide structure used in combination with a standard form and configured for locating blank spaces on a display form of a display screen of a word processor, said structure comprising:

(a) a line scale including a linear, elongated configuration and disposed to extend the length of the standard form, (b) a character scale having a linear, elongated configuration and disposed to extend along the width of the standard form and in substantially perpendicular relation therewith, (c) attachment means movably mounted on each of said line scale and character scale and structured for movably interconnecting said respective scales and allowing movement of each scale relative to the other, (d) connecting means removably attaching each of said respective scales to the standard form, said connecting means comprising a first connector and a second connector affixed to said line scale and said character scale respectively, (e) said first connector and said second connector structured and disposed to slidingly engage and movably attach said line scale and said character scale respectively along a transverse length and a longitudinal length respectively of the standard form, (f) indicia formed along the length of each of said line scale and said character scale and respectively defining line locations and character locations on said respective scales, (g) said attachment means and said first and second connectors cooperatively disposed relative to the standard form and said respective scales to allow relative movement of each scale to one another and to the standard form, (h) whereby service locations on the standard form may be identified by coordinate indicia on both said line scale and said character scale and referenced to equivalent locations of a displayed form.

2. A structure as in claim 1 wherein said first connector is secured to one end of said line scale and disposed and structured to slidably engage and movably attach said line scale along a transverse peripheral edge of the standard form.

3. A structure as in claim 2 wherein said second connector is secured to one end of said character scale and disposed and structured to slidably engage and movably attach said character scale along a longitudinal peripheral edge of the standard form.

4. A structure as in claim 2 wherein each of said first and said connectors include a flange portion configured to at least partially surround a respective peripheral edge of the standard form and slidably engage an undersurface of the standard form.

5. A guide structure as in claim 1 wherein said first and said second connectors are cooperatively disposed in spaced relation to one another and to said attachment means on the standard form to allow relative movement of each scale relative to the other and to the standard form in a direction transverse to its own longitudinal axis and colinear to the others scale's longitudinal axis.

6. A structure as in claim 1 wherein said line scale and said character scale each include an elongated slot integrally formed therein and extending along the length thereof, said attachment means comprising a pin element structured to extend concurrently through each of said elongated slots in transverse relation to the plane of both said line scale and said character scale and in movable engagement with each of said scales, said pin element disposed and structured to travel along the length of each of said slots.

7. A guide structure as in claim 1 wherein each of said line and character scales is formed from a transparent material, whereby the material form if viewable through each of said line and character scales.

* * * * *